(12) United States Patent
Rowe et al.

(10) Patent No.: US 12,373,919 B2
(45) Date of Patent: Jul. 29, 2025

(54) IMAGE-FILTERING INTERFACE

(71) Applicant: Samsung Electronics Co., Ltd., Suwon-si (KR)

(72) Inventors: Megan Rowe, Sunnyvale, CA (US); Ye Zhao, Sunnyvale, CA (US); Kushal Kardam Vyas, Santa Clara, CA (US); Jihee Kim, Mountain View, CA (US); Imran Mohammed, San Jose, CA (US); Thomas Brenner, Sunnyvale, CA (US); Hanna Fuhrmann, San Francisco, CA (US); Sajid Sadi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 18/093,251

(22) Filed: Jan. 4, 2023

(65) Prior Publication Data

US 2024/0221119 A1 Jul. 4, 2024

(51) Int. Cl.
*G06T 5/20* (2006.01)
*G06F 3/0482* (2013.01)
*G06T 5/40* (2006.01)
*G06T 7/90* (2017.01)
*G06V 10/74* (2022.01)

(52) U.S. Cl.
CPC ............. *G06T 5/20* (2013.01); *G06F 3/0482* (2013.01); *G06T 5/40* (2013.01); *G06T 7/90* (2017.01); *G06V 10/761* (2022.01); *G06T 2207/10024* (2013.01); *G06T 2207/20104* (2013.01)

(58) Field of Classification Search
CPC .. G06T 5/20; G06T 7/90; G06T 7/194; G06T 2207/10024; G06T 2207/20104; G06T 2200/24; G06T 5/00; G06T 5/40; G06V 10/761; G06F 3/0482; G06F 3/0484;
(Continued)

(56) References Cited

U.S. PATENT DOCUMENTS 9,031,326 B2 5/2015 Yu
9,857,953 B2 1/2018 Sunkavalli
(Continued)

FOREIGN PATENT DOCUMENTS

TW 201316284 A 4/2013

OTHER PUBLICATIONS

International Search Report and Written Opinion in Application No. PCT/KR2023/018892.

*Primary Examiner* — Duy M Dang

(57) ABSTRACT

In one embodiment, a method includes accessing an initial image and applying each image filter from a set of one or more N image filters to the initial image to create N filtered images. The method further includes generating a similarity metric for each pair of images in a set of images comprising the initial image and the N filtered images and determining, based on the similarity metrics, a placement of each image in the set of images within an image-filter space. The method further includes generating, based on the image-filter space, a selectable image-filter interface; and providing the selectable image-filter interface for display, wherein each selectable region of the selectable image-filter interface is associated with a particular filtering of the initial image.

20 Claims, 10 Drawing Sheets
(8 of 10 Drawing Sheet(s) Filed in Color)

(58) Field of Classification Search
CPC ........ G06F 3/0488; G06K 9/46; H04N 5/232; H04N 5/235
See application file for complete search history.

(56) References Cited

U.S. PATENT DOCUMENTS

| | | |
|---|---|---|
| 9,917,987 B2 | 3/2018 | Bryant |
| 9,942,484 B2 | 4/2018 | Pan |
| 10,037,615 B2 | 7/2018 | Aksoy |
| 10,909,420 B2 | 2/2021 | Sandhan |
| 2008/0089591 A1 | 4/2008 | Zhou |
| 2008/0180533 A1 | 7/2008 | Craig |
| 2016/0365121 A1* | 12/2016 | DeCaprio ............ H04N 9/8205 |
| 2018/0122053 A1 | 5/2018 | Cohen |
| 2018/0204061 A1* | 7/2018 | Antol ..................... G06V 20/20 |
| 2019/0220962 A1* | 7/2019 | Liu .......................... G06T 5/20 |
| 2020/0026952 A1 | 1/2020 | Kim |
| 2021/0318798 A1 | 10/2021 | Manzari |
| 2021/0337112 A1 | 10/2021 | Han |
| 2021/0390673 A1 | 12/2021 | Ban |

* cited by examiner

IMAGE-FILTERING INTERFACE

TECHNICAL FIELD

This application generally relates to an electronic interface for filtering electronic images.

BACKGROUND

Electronic images can be modified by filtering the image. Filtering changes the values of one or more pixels in the image, most often to change the visual appearance of the image. For example, an image filter may be used to brighten portions or all of an image, or to adjust the visual appearance of one or more colors in some or all of the image. Image filtering is often performed by software executing on a computing device that has access to the image, for example by a computing device that stores the image in memory.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
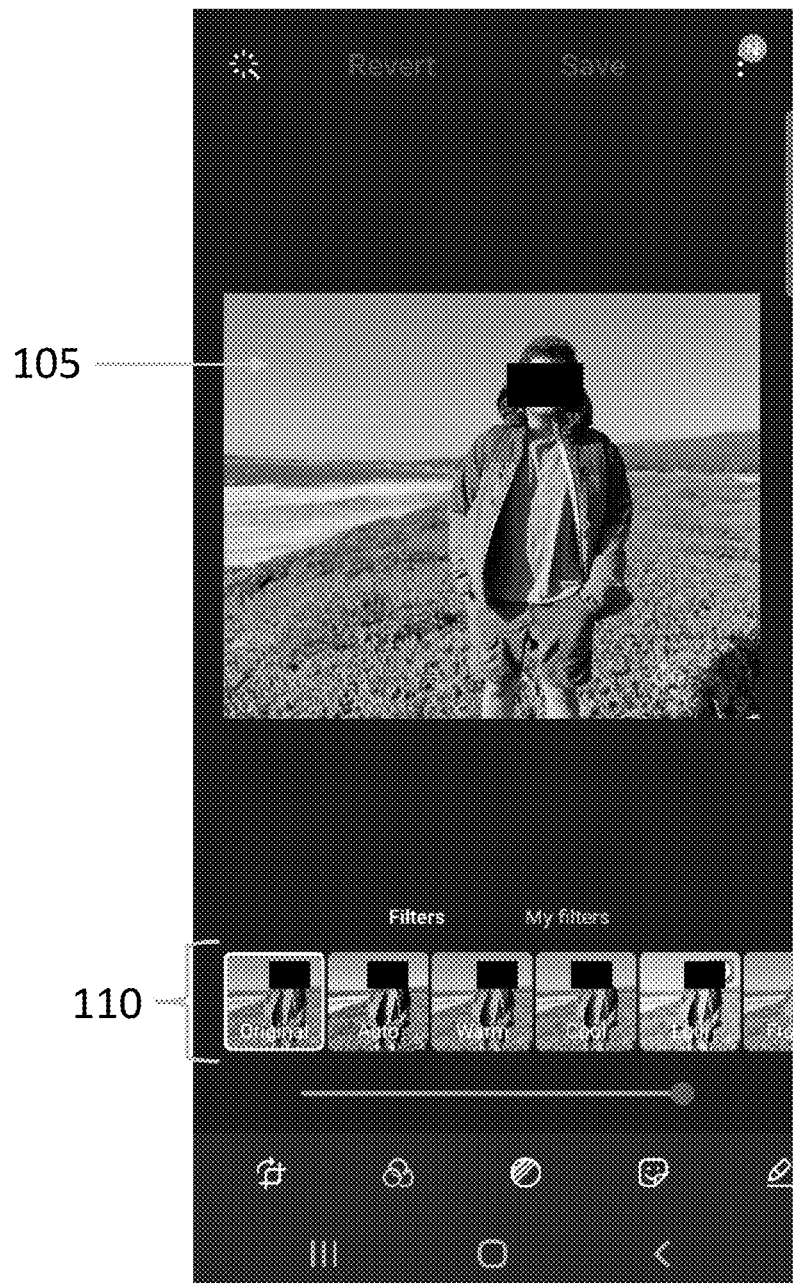
FIG. 1 illustrates a typical approach for filtering an image.

FIG. 1 illustrates a typical approach 100 for filtering an image. For example, an image 105 may be presented to a user, and a set of predefined filters may be applied to the image, resulting in a set of predefined filtered images 110 being displayed to a user. The approach in FIG. 1 involves scrolling through tiles of filtered thumbnail images 110 in order to select an image filter. This process is cumbersome and makes it difficult to compare different image filters, especially when the filters are not visibly in the same screen, and decision fatigue can prevent a user from exploring the entire space of possible image styles. In addition, these image filters may not be ordered in an intuitive way, and the transition between one filter to the next is not seamless. Moreover, in the typical approach it is difficult to tell how the filters relate to one another. In addition, the filter space in the interface presented to the user is constrained to the predefined filters available for selection, and the user must navigate away from this interface to access a larger or different filter space, if such access is available at all.

Figure 2:
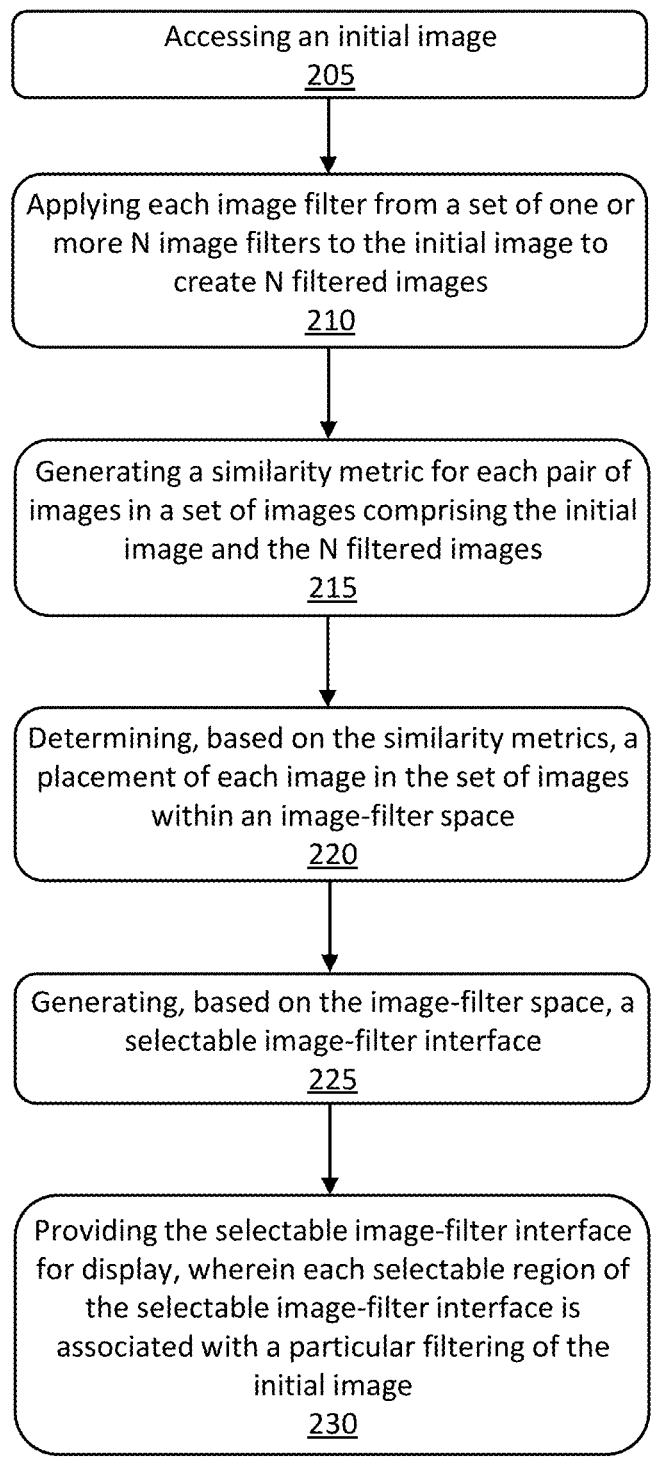
FIG. 2 illustrates an example method for creating an improved interface for filtering images.

FIG. 2 illustrates an example method for creating an improved interface for filtering images (which, in some embodiments, can include one or more image frames that form video or animation). As explained more fully herein, the improved interface provides an intuitive, seamless way for a user to explore an image-filter space. In addition, the filter space allows a user to immediately select not only from predefined filters, but also to blend filters together to create customized filtering. In addition, the interface creates groups of similar filters near each other, allowing a user to navigate quickly and efficiently to similar or to different filtering visuals, as desired.

Step 205 of the example of FIG. 2 includes accessing an initial image. The initial image may be, for example, an image captured by a computing device that is executing some or all of the steps of the example method of FIG. 2. For example, a smartphone may include one or more cameras for capturing images, and the initial image may be an image captured by the smartphone. In particular embodiments, step 205 includes accessing an image from a memory of a client computing device, such as a smartphone, laptop, TV, etc. In particular embodiments, step 205 may include receiving an image from another computing device, such as for example from a server computing device or another client device that stores the image. This disclosure contemplates that, in particular embodiments, a single computing device may perform all of the steps of the example method of FIG. 2. In other embodiments, more than one computer may perform the steps; for example, a first computing device may access an image while one or more other computing devices may perform other steps, such as steps that include filtering the accessed initial image.

Step 210 of the example method of FIG. 2 includes applying each image filter from a set of one or more N image filters to the initial image to create N filtered images. In particular embodiments, the set of image filters may be a set of predefined image filters that exist on a computing device. In particular embodiments, the set of image filters may be different for different categories of images. For example, a portrait image may be associated with a first set of filters, an image of natural scenery may be associated with a second set of filters, an image of food may be associated with a third set of images, etc. In particular embodiments, some of the filters in a set of images for one category of images may overlap with the set of image filters for another image category.

This disclosure contemplates that, in step 210, any suitable method may be used to apply the N image filters and generate the N filtered images from the initial image. For example, a neural network may be used to generate the filtered images. As another example, a look-up table may be used to generate the N filtered images, for example by mapping an input pixel value to an output pixel value according to a predefined table. In particular embodiments, a different look-up table may be used for each channel of the initial image (e.g., each channel of an RGB image, although any suitable color space format is contemplated herein). In this example, each filtered image is created by applying the look-up table(s) corresponding to a particular filter. In the example of FIG. 2, N filtered images are generated by applying the N image filters to the initial image. There are therefore N+1 images: the N filtered images plus the initial image.

In particular embodiments, one or more preprocessing steps may be performed on the set of N+1 images. While in particular embodiments preprocessing is optional, it can be performed to improve runtime or accuracy. As one example, each image may first be converted from the RGB color space into a different color space (e.g. sRGB, HSV, LAB, etc.), such as a color space that more closely aligns with the way human vision perceives color. For example, the LAB color space separates out high-fidelity luminance components from the more compressible chrominance components. After converting an initial RGB image to another color space, particular embodiments may then downsample the initial image and compute a quantized image from the downsampled image. This downsampled image expresses the image in fewer and unique colors. As an example, particular embodiment may quantize images to have only 128 colors, where each color is an RGB/YCbCr/LAB, etc. triplet value. This quantization may be based on, e.g., the redundant nature of images of natural scenes. As a result, subsequent operations work with a smaller dimensional space, providing faster algorithmic performance and/or faster processing time. As explained above, some or all preprocessing steps may be optional, for example depending on computational needs.

Step 215 of the example method of FIG. 2 includes generating a similarity metric for each pair of images, where each image in the pair is taken from a set of images that includes the initial image and the N filtered images. As explained above, this set of images includes N+1 images. Particular embodiments may use preprocessed images, such as downsampled images or the quantized images described above, to calculate the similarity metric between different filtered images.

The similarity metric identifies a similarity between a pair of filtered images. For example, particular embodiments may use a distance metric as a similarity metric to determine a similarity between a pair of filtered images. This disclosure contemplates that any suitable distance metric may be used, such as for example Euclidean, PSNR, or a neural-network based approach. In particular embodiments, using the distance metric results in a total of $_nC_2$ (n choose two) unique scalar distances, where n here is the number of items in the set, i.e., the N+1 images (the N filtered images plus the initial image). In particular embodiments, a distance calculation may be made on the 2D image arrays, e.g., using each pixel value and its location as input to the distance calculation. In contrast, particular embodiments may reduce the 2D image representation into a 1D array by creating a histogram of pixel values for each channel.

For example, particular embodiments may calculate a similarity metric by using the Wasserstein distance d:

$$d(u, v) = \inf_{\pi \in \Gamma(u, v)} \int_{\mathbb{R} \times \mathbb{R}} |x - y| d\pi(x, y)$$

where u represents the histogram of a given channel in a predefined filtered image and v represents the histogram of the same channel in the other filtered image in the pair. In particular embodiments, the distance metric (in this example, the Wasserstein distance) may be computed for each channel and summed over the n image channels (e.g., three image channels) to obtain a single scalar distance value for each image pair:

$$d = \sum_{i=0}^{n} d(u_i, v_i)$$

Particular embodiments may create a distance matrix containing the distance scalar values, for example:

$$\begin{pmatrix} d_{(0,0)} & \cdots & d_{(0,N+1)} \\ \vdots & \ddots & \vdots \\ d_{(N+1,0)} & \cdots & d_{(N+1,N+1)} \end{pmatrix}$$

Step 220 of the example method of FIG. 2 includes determining, based on the similarity metric, a placement of each image in the set of images within an image-filter space. For instance, the example above outputs an array of pairwise distances between each combination of images from the set of N+1 images. Particular embodiments may then assign each image in the set of images a coordinate on an 2D layout, based on the pairwise distances. Particular embodiments may group perceptually similar filters and determine the coordinate locations of the filters. This disclosure contemplates that placing filtered images within the image-filter space may be accomplished by any suitable method, such as machine learning, clustering, heuristic, simulation, etc. Moreover, while the example below discusses placing the filter in a 2D space (for example, because the resulting filter interface may be presented on a 2D display), this disclosure contemplates that such image placement may be made in other dimensions, for example in a 3D space when presenting 3D content to a viewer.

Figure 3:
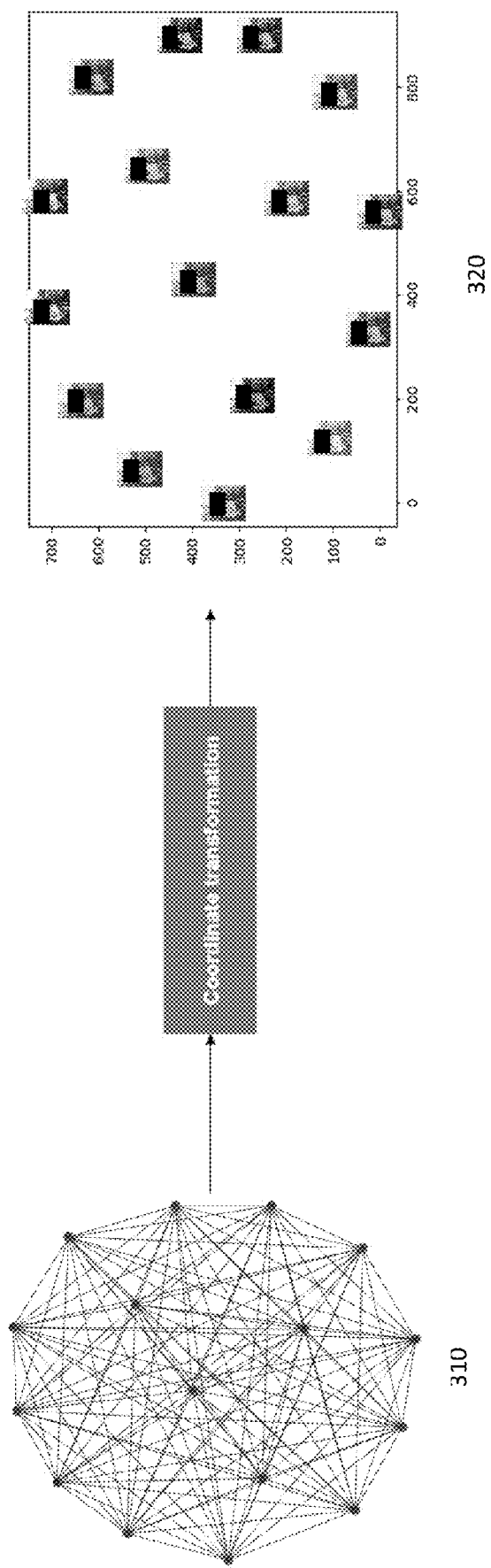
FIG. 3 illustrates an example spring-force model.

As one example of generating the image coordinates in a 2D image-filter space, particular embodiments may construct a 2-dimensional layout constrained to a predetermined width and height. As one example, particular embodiments may use a spring force model where there are N+1 nodes, each node representing an image in the set, and each node has N links representing the distance between pairs of images. In this example, the initial distance values between image are obtained from the pairwise distances discussed above. The spring force model is one example of a physical simulation that seeks to minimize the energy between nodes to produce a layout that is constrained by features including but not limited to width, height, link distance, gravity, charge, etc. In particular embodiments, the similarity metric (such as the distance metric discussed above) may be used as the initial conditions for the link distance in a spring-force model. The simulation is run, and equilibrium of the model corresponds to the final coordinates of the image nodes. In particular embodiments, a spring force model simulation outputs coordinates bounded by a predefined region, such as [−1,1]. Particular embodiments may perform a coordinate transformation to scale these coordinates to the predefined layout width and height. FIG. 3 illustrates an example spring-force model 310, which after a coordinate transformation and simulation results in each image in the set of images being associated with a particular coordinate in the 2D space. Layout 320 in FIG. 3 illustrates an example set of images overlaid over their respective coordinate positions after coordinate transformation.

Figure 5:
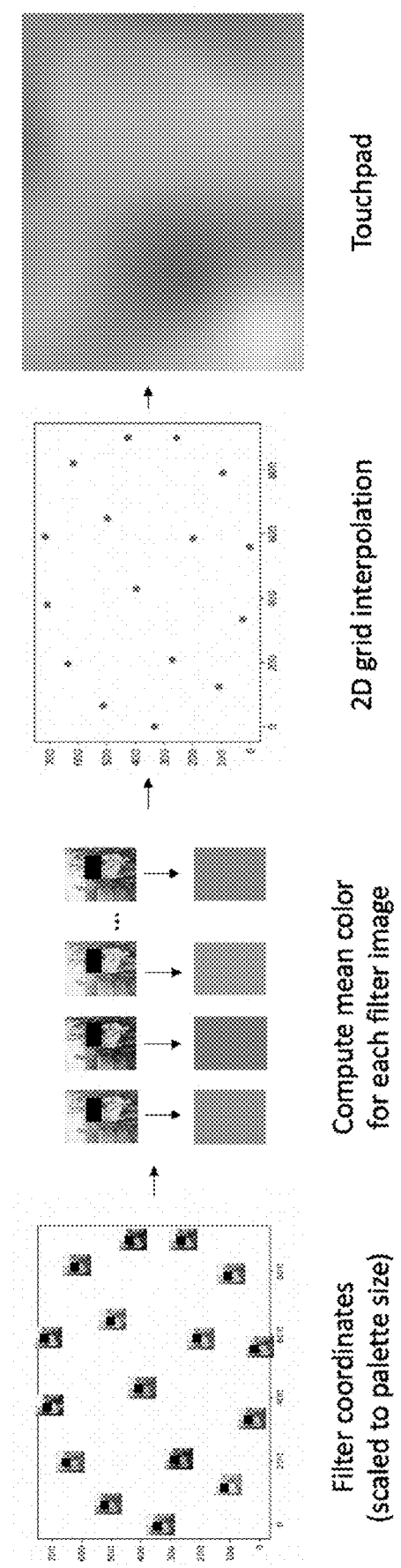
FIG. 5 illustrates aspects of an example procedure for creating an improved interface.
Figure 6:
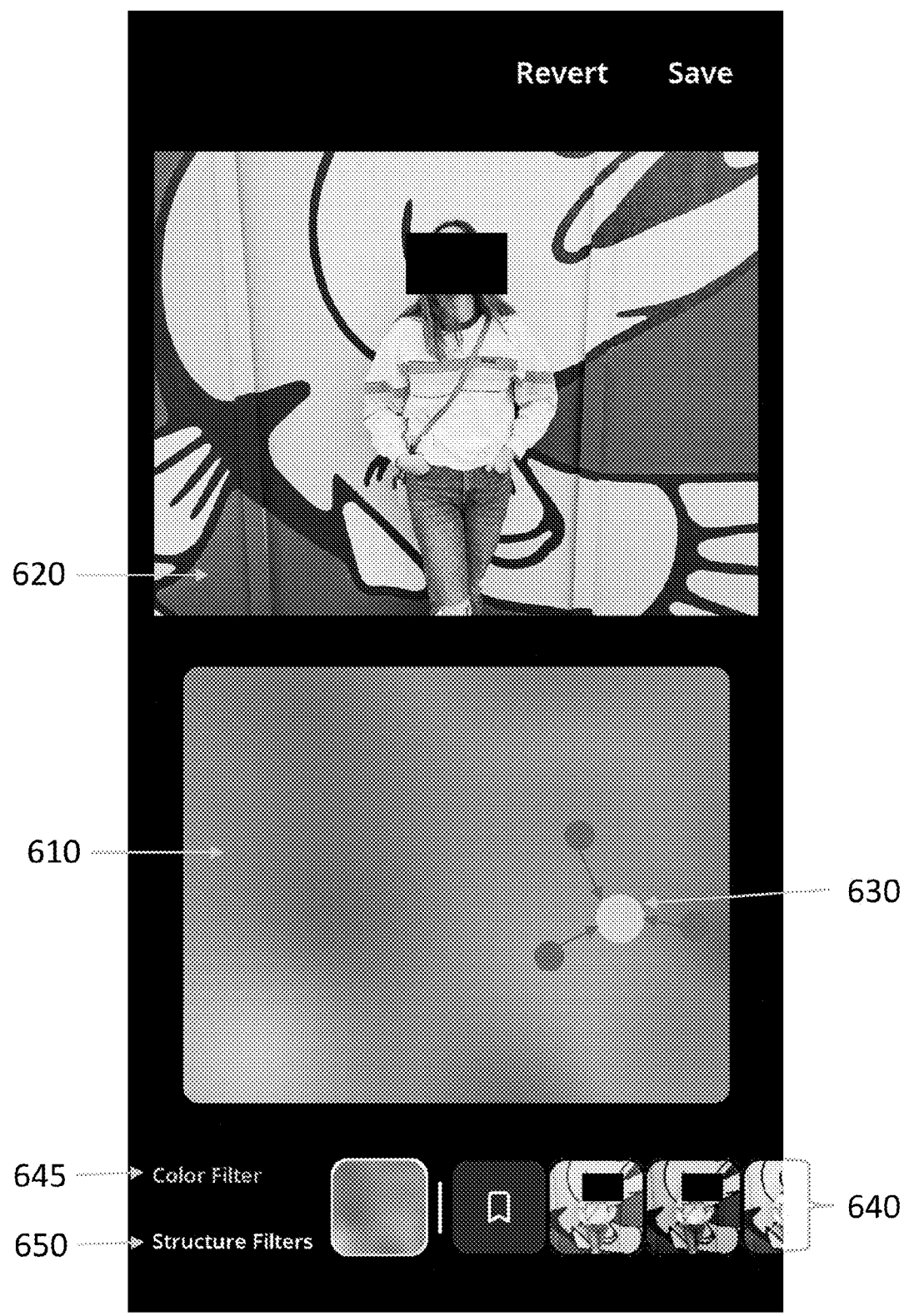
FIG. 6 illustrates an example UI with an example interface.

Step 225 of the example method of FIG. 2 includes generating, based on the image-filter space, a selectable image-filter interface. FIGS. 5 and 6 illustrate example image-filter interfaces, as described more fully below.

In particular embodiments, step 225 may include determining distances and weights for each point in the image-filter-space layout (e.g., each point in layout 320 of FIG. 3) so that each point is associated with a particular filtering, because as illustrated in, e.g., image 320 of FIG. 3, using the set of N+1 images results in a sparse image-filter space. For instance, in the example above step 220 results in N+1 coordinates scaled to a H×W layout. For an arbitrary point (x,y) in this 2D space (where 0≤x≤W and 0≤y≤H), particular embodiments calculate the distance between that point and each of the N+1 image coordinates. Particular embodiments may use a distance metric, such as Euclidean distance, in order to calculate the N+1 distances between the arbitrary coordinate (x,y) and the N+1 coordinates of the N filtered images and the 1 initial image.

After obtaining the array of N+1 distances for each point, particular embodiments use an inverse distance-based weighting function to give image coordinates that are farther away a smaller weight than the weight given to image coordinates that are closer to the target (x,y) coordinate. In subsequent steps, this inverse distance weighting function defines how much contribution each pre-existing image coordinate makes to each target location in the interface. As one example of determining a distance and a weight for each point in the image-filter-space layout, in a 2D layout, the Euclidean distance between a point p and a point q is:

$$d(p, q) = \sqrt{(q_1 - p_1)^2 + (q_2 - p_2)^2}$$

The weights in this example may be calculated by using the inverse square distance:

$$w = \frac{1}{d(p, q)^2}$$

This process is repeated for each (x,y) coordinate in the image-filter layout that is not an existing image coordinate (i.e., a coordinate corresponding to the N+1 images), and the image-filter layout has a total of H*W coordinates. Particular embodiments store the weight files in the memory of the device for, e.g., real-time image rendering when a user selects points of a selectable image-filter interface, as described more fully below.

Step 225 may include using the output coordinates and weights to generate the selectable image-filter interface. As an example, particular embodiments may first define a single scalar value (e.g., (R,G,B) value) to represent the color information in the N+1 images. For each of the N+1 images, particular embodiments may calculate a scalar value to represent the image information, meaning that each coordinate will be represented on a display by a single color. The result is a sparse 2D grid where only N+1 values out of the H×W values are defined. In order to determine these missing values, particular embodiments use weighted interpolation of the N+1 RGB values to fill in the rest of the display-color values for the interface.

Figure 4:
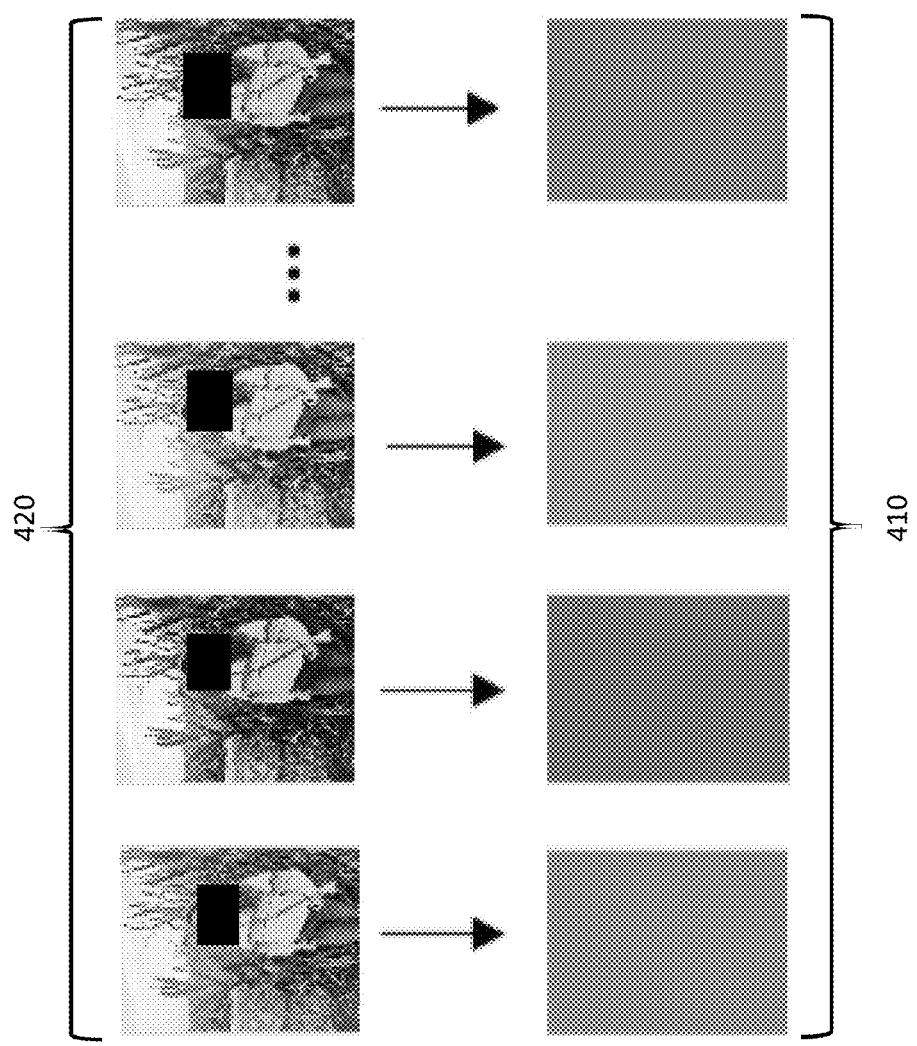
FIG. 4 illustrates mean RGB values from example filtered images.

As one example of using a single scalar value to represent color information, particular embodiments may use the mean of the image. For example, particular embodiments may compute the mean (R, G, B) values for each of the N+1 filtered images, for example by splitting the RGB input image into its three channels, and for each channel, calculating the mean pixel intensity value for a total of 3 values per image. Particular embodiments may store each of these mean RGB values at their corresponding filter coordinate in the image-filter space. For example, FIG. 4 illustrates mean RGB values 410 from example filtered images 420, each of which are the result of applying an example predefined filter to a particular initial image.

After the scalar values are obtained, the result is N+1 values (N+1 (R,G,B) values, in this example) in the 2D grid, each scalar value corresponding to one of the N+1 filtered image. However, in a grid of H×W, we have H*W−(N+1) missing values. To fill in these missing values, particular embodiments may use a 2D grid interpolation method. Any suitable method such as nearest neighbors, linear, or cubic interpolation can be used. As one example, particular embodiments may use thin plate spline interpolation. In order to perform a nonlinear interpolation, such embodiments must first initialize the boundary conditions on the 2D grid. For each of the 4 boundary (corner) coordinates, particular embodiments determine the k nearest neighbor filter coordinates and interpolate the output scalar ((R,G,B), in this example) values from the corresponding weights $w_i$, for example by using the inverse square distance, as explained above. The equation below may be used to determine the output channel value $c_{out}$.

$$c_{out} = \frac{\sum_{i=1}^{k} c_i * w_i}{\sum_{i=1}^{k} w_i}$$

Particular embodiments then apply thin plate spline interpolation to fill in the rest of the display-color values for the 2D interface. The filter interface is then obtained after all scalar values are obtained. FIG. 5 illustrates an example flow starting from image coordinates of the N+1 images, computing mean colors for each of those coordinates, and then using 2D grid interpolation to fill in the scalar values (e.g., mean (R,G,B) color) for each point in the 2D grid that does not correspond to an existing image coordinate. The end result is a filter interface (or touchpad, in this example), with each point in the interface representing the mean (R,G,B) color value that would result, given an initial image, from selecting that point in the interface.

Step 230 of the example of FIG. 2 includes providing the selectable image-filter interface for display, wherein each selectable region of the selectable image-filter interface is associated with a particular filtering of the initial image. FIG. 6 illustrates an example of an interface that may be provided by step 230. For example, FIG. 6 illustrates interface 610. A user interface may include interface 610 and image 620, which illustrates how an image appears if the filtering corresponding to a particular point, e.g., point 630, is applied to the image. In particular embodiments, a UI may include a preset list of filtered images, such as shown in list 640. In particular embodiments, toggles 645 and 650 may select the selectable filter interface and the preset list of filtered images to use to display image 620.

Particular embodiments, for example as illustrated in FIG. 6, may output a filtered image given any arbitrary (x,y) coordinate on the filter interface, i.e., may present the image as filtered based on the given (x,y) coordinate. For example, the k nearest predefined filters to the given (x,y) coordinate and those filters' corresponding weights as determined for that (x,y) coordinate, may be used to generate a filter. FIG. 6 illustrates an example in which the image filtering associated with point 630 is determined by the k=3 nearest filters, using the weights of those filters as determined for point 630. The filtered image may be created by using a weighted interpolation, using the k nearest filters, of all the RGB values in the image to produce the final output filtered image. For example, particular embodiments mays use linear interpolation to interpolate the RGB pixel values. This disclosure contemplates that the values to be interpolated are not restricted to the RGB color space, and any suitable interpolation method may be used.

In particular embodiments, each time a user chooses an initial image to edit, then the filter arrangement process (e.g., as explained in example steps 215-225 of the example method of FIG. 2) may be performed in real time. In other embodiments, the filter arrangement may created one time and in advance, for example by analyzing a set of images and determining based on the set an appropriate static filter layout, thereby saving computational resources. For example, the latter embodiments may combine the image arrays between all images in one image category, and compute the total distance summed over these images for every pair of predefined filters. Thus, each image category (e.g., type of image) may have a predetermined, static filter arrangement in the image-filter space.

Figure 7:
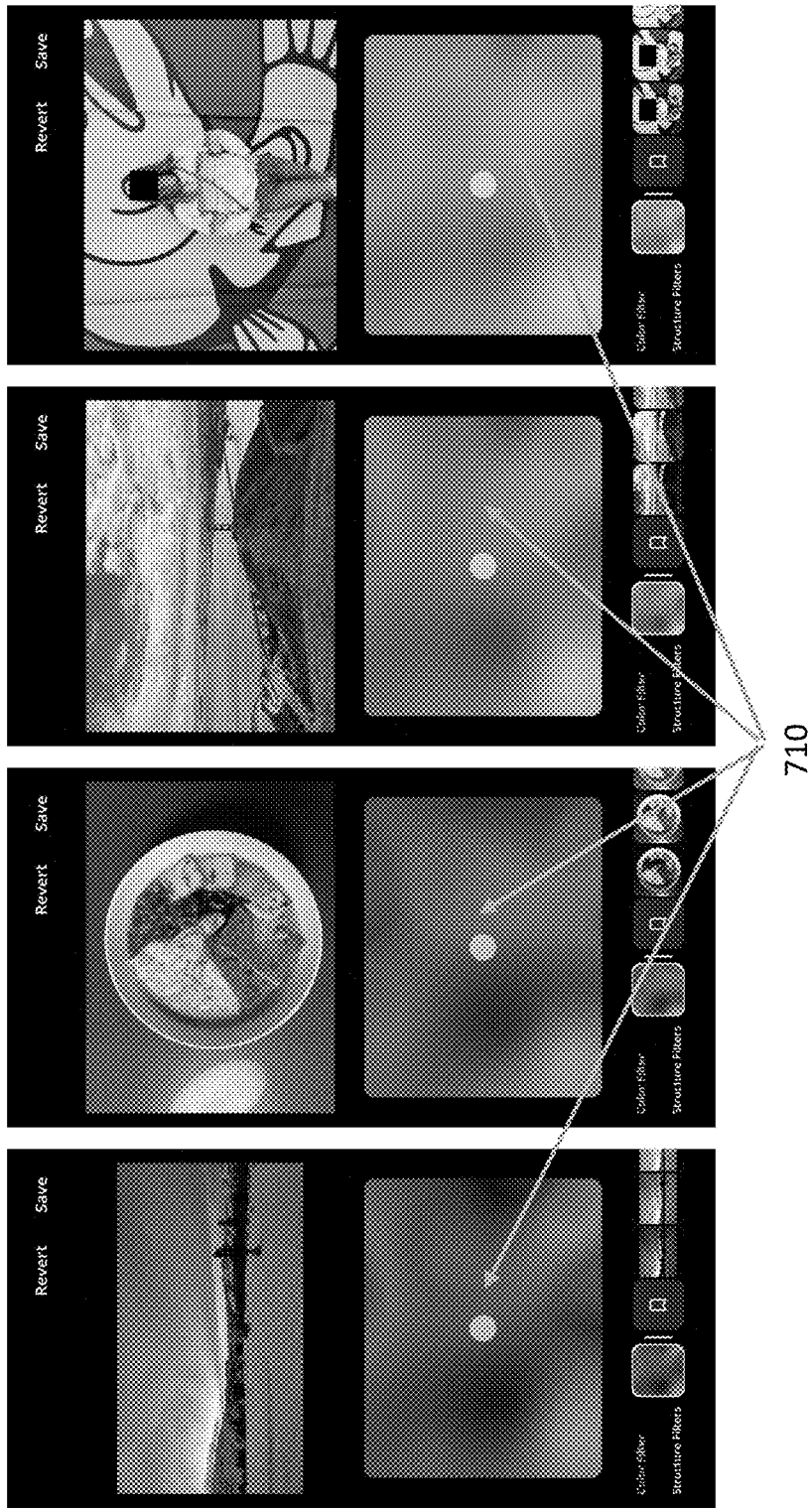
FIG. 7 illustrates an example in which the filter layout in the image-filter space is predetermined for a set of images.

FIG. 7 illustrates an example in which the filter layout in the image-filter space is predetermined for a set of images. FIG. 7 illustrates four different images, but each image shares a predetermined filter arrangement in the image-filter space. As a result, the contours of the selectable image-filter interface tend to remain constant or similar, even when different initial images are input. For example, region 710 is present in each of the interfaces of the four different images. FIG. 7 also illustrates that, even for a similar filter arrangement, different interfaces for different images will likely still look different, for example due to the differences in coloring of the images, which in the example of FIG. 2 results in different mean colors being displayed in the interface.

Figure 8:
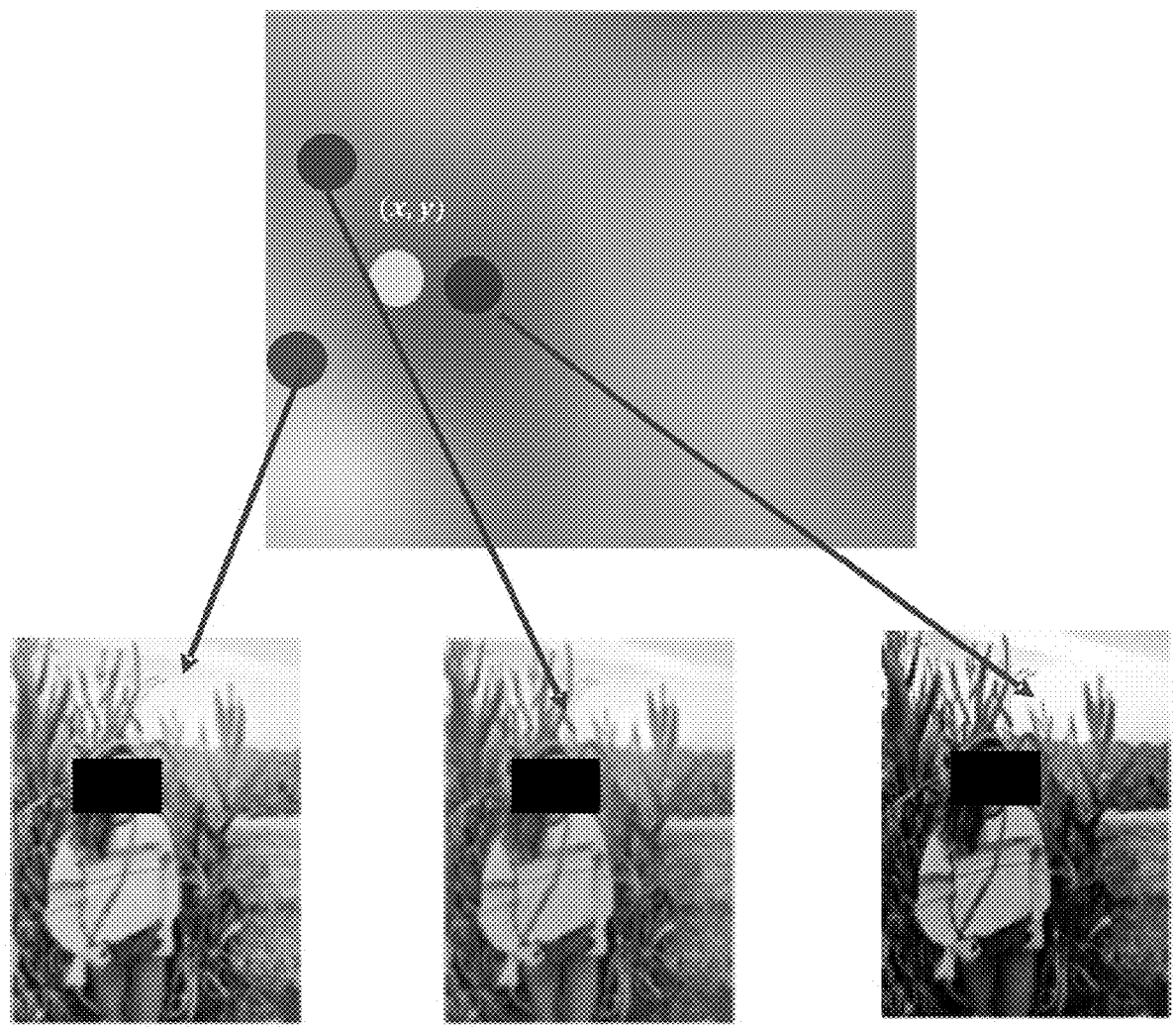
FIG. 8 illustrates an example approach for determining a filtered image based on a particular selection within a selectable image-filter interface.

FIG. 8 illustrates an example approach for determining a filtered image based on a particular selection within a selectable image-filter interface. As illustrated in FIG. 7, the point x, y (illustrated by the grey dot) has been selected, e.g., by the user. The point does not correspond to the location of a predefined filter, and so the nearest k filters (k=3, in this example) are selected and weighted as described above in order to obtain the filtered image corresponding to the point x, y. FIG. 8 illustrates the filtering associated with each of the k=3 filters that will be interpolated to obtain the filtering associated with the point x, y.

Particular embodiments obtain the k nearest filters and corresponding weights and then perform a weighted interpolation of the RGB values of those k filters. For example, particular embodiments may split the k output images into their constituent channels and interpolate the final pixel values to obtain $I_{out}$, the output filtered image, according to:

$$I_{out} = \frac{\sum_{i=1}^{k} I_i * w_i}{\sum_{i=1}^{k} w_i}$$

where k is the number of neighbors, $I_i$ is the $i^{th}$ filtered imaged, and $w_i$ is the weight associated with the $i^{th}$ filter. As illustrated in this example, each image channel of the k filtered image may weighted and summed, according to the example equation above, to obtain each channel of the resulting filtered image corresponding to the point x, y.

In particular embodiments, interpolation of nearby filters is performed in real-time as a user selects a point x, y on the interface. Other embodiments may store low-resolution images for each of some or all of the points x, y on the interface, on the user's device or in the cloud (or both), so that when a user selects a point x, y, interpolation is not required. In the latter embodiments, the low-resolution image will be upscaled for purposes of displaying the image, sending the image, and/or saving the image to a photo library.

As explained with reference to the example method of FIG. 2, a selectable image-filter interface displays a mean color (e.g., mean (R,G,B) triplet value) for a particular point on the interface. The actual filtering of the image occurs on, for example, a per-pixel basis, and therefore similar mean colors displayed on the interface do not necessarily represent similar filtering other than the mean color after filtering. Thus, as illustrated by the example 2D interfaces shown in the figures, disparate regions of an interface may have similar colors, but as explained above, their relative distance in the interface tends to overall represent a similarity between the entire filtering applied to the images. In some instances, the distance between regions in an interface may also represent constraints imposed during the filter-placement and interface-generation processes, e.g., constraining a spring-model simulation to a 2D space.

Figure 9:
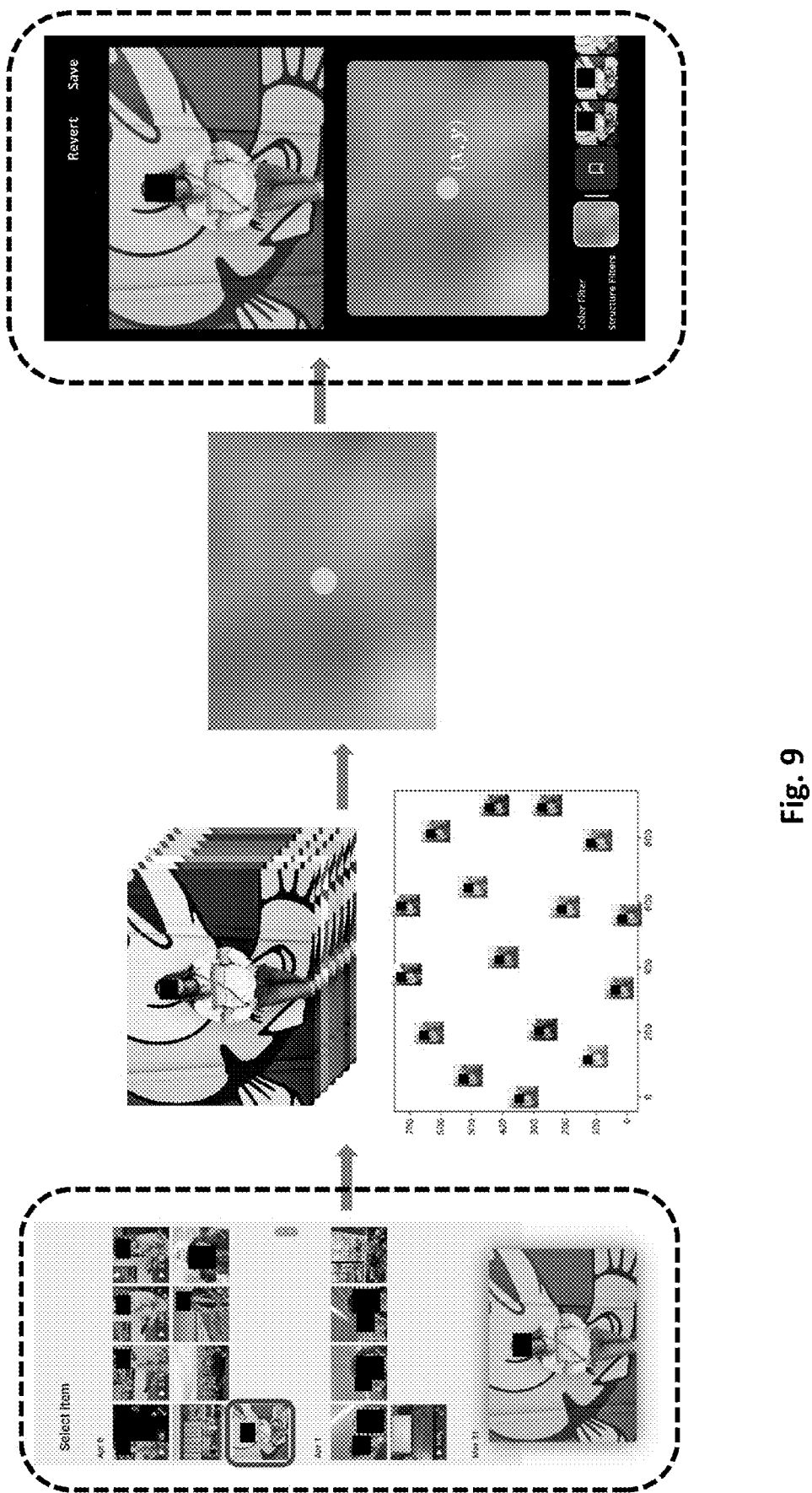
FIG. 9 illustrates portions of an example process corresponding to the example method of FIG. 2

FIG. 9 illustrates portions of an example process corresponding to the example method of FIG. 2. As illustrated in FIG. 8, a user can select an image for filtering. The image may be selected from, for example, a gallery or a camera application. After selecting an image, a set of predefined filters are applied to the image, and the filtered images are arranged in an image-filter space, such as the 2D image-filter space shown in FIG. 8. A selectable image-filter interface is generated and then presented on a UI to the user, with each point x, y in the interface corresponding to a particular filtering of the selected image.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, such as the computer system of FIG. 10, this disclosure contemplates any suitable combination of any suitable components, devices, or systems carrying out any suitable steps of the method of FIG. 2. Moreover, this disclosure contemplates that some or all of the computing operations described herein, including the steps of the example method illustrated in FIG. 2, may be performed by circuitry of a computing device, for example the computing device of FIG. 10, by a processor coupled to non-transitory computer readable storage media, or any suitable combination thereof.

In particular embodiments, certain features described above, such as image preprocessing, determining a similarity metric, and/or determining the placement of image in an image-filter space based on the similarity metrics, may be replaced with other steps, such as for example a neural-network based approach to determine the coordinates of the filtered images in the 2D space. Any suitable neural network may be used, such as for example a CNN, GNN, etc. In particular embodiments, some or all of those steps may be replaced with a manual arrangement that places similar filter styles relatively closer together in an image-filter interface, for example manual arrangement by a subject matter expert (e.g., a professional photographer).

Figure 10:
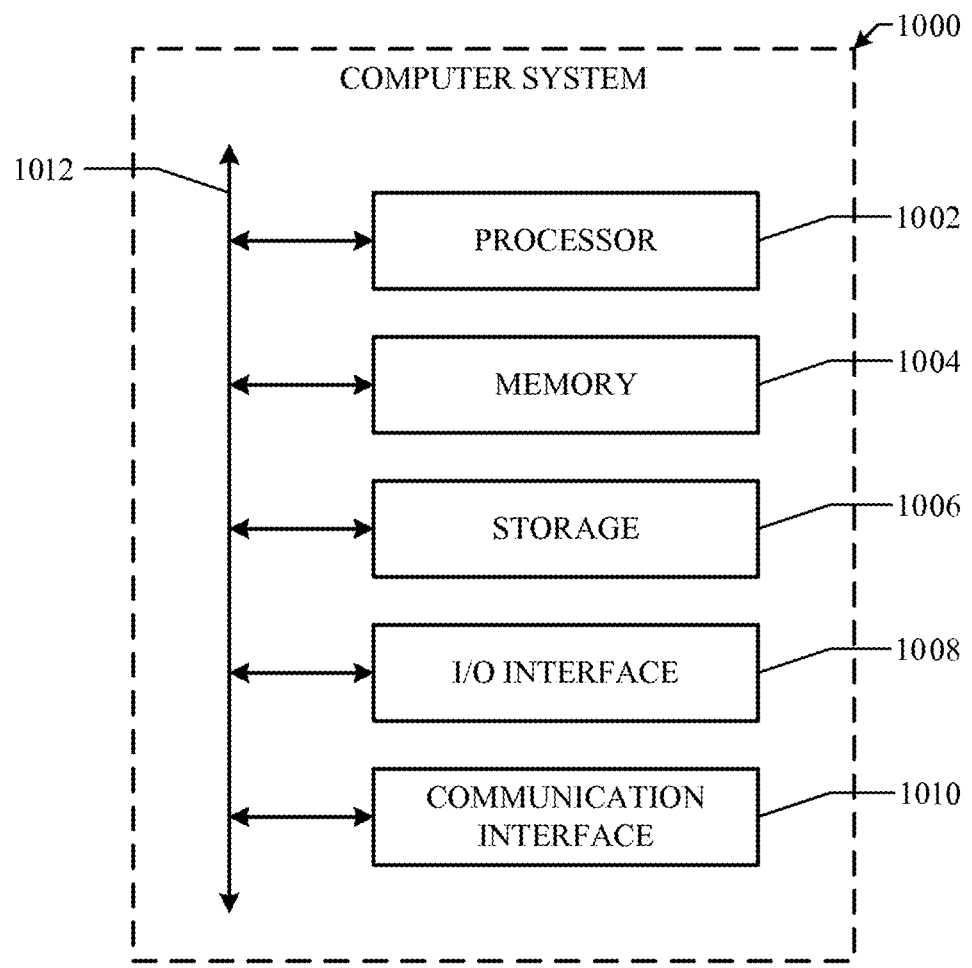
FIG. 10 illustrates an example computing system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
    accessing an initial image;
    applying each image filter from a set of one or more N image filters to the initial image to create N filtered images;
    generating a similarity metric for each pair of images in a set of images comprising the initial image and the N filtered images;
    determining, based on the similarity metrics, a placement of each image in the set of images within an image-filter space;
    generating, based on the image-filter space, a selectable image-filter interface; and providing the selectable image-filter interface for display, wherein each selectable region of the selectable image-filter interface is associated with a particular filtering of the initial image.

2. The method of claim 1, wherein the N image filters from the set of one or more image filters are predetermined based on a category associated with the initial image.

3. The method of claim 1, wherein the similarity metric comprises a scalar distance metric based on a difference between image-channel histogram values of a pair of images.

4. The method of claim 3, wherein the difference between image-channel histogram values of a pair of images is determined for each of a plurality of image channels.

5. The method of claim 1, wherein the image-filter space comprises a 2-dimensional space of a predetermined width and height.

6. The method of claim 1, wherein determining the placement of each image in the set of images within the image-filter space comprises using a spring-force model to determine the placement, wherein each image in the set of images comprises a node in the spring-force model and each similarity metric is associated with a link distance in the spring-force model.

7. The method of claim 1, wherein each selectable region of the selectable image-filter interface is represented by a particular color that represents a particular filtering associated with that selectable region.

8. The method of claim 7, wherein generating the selectable image-filter interface comprises determining, for each image filter in the set of one or more image filters, an average color representing that filter.

9. The method of claim 1, wherein generating the selectable image-filter interface comprises:
for each of a plurality of points of the user-selectable interface that are not associated with an image filter from the set of one or more N image filters, then determining an image filter for that point by interpolating the image filters from the set of image filters as weighted by a distance from each image filter from the set of N image filters to that point.

10. The method of claim 1, further comprising displaying, on a display of a client computing device, the selectable image-filter interface.

11. The method of claim 10, further comprising:
receiving user input selecting a particular region of the selectable image-filter interface;
determining whether the selected region is associated with a particular image filter from the set of image filters;
when the selected region is associated with a particular image filter from the set of image filters, then applying the particular image filter; and
when the selected region is not associated with a particular image filter from the set of image filters, then applying a filter based on the selected region's proximity to one or more of the N image filters.

12. The method of claim 11, wherein applying a filter based on the selected region's proximity to one or more of the N image filters comprises selecting the k nearest image filters and interpolating the image filters based on a distance between the selected region and each of the k image filters.

13. The method of claim 10, further comprising:
receiving user input selecting a particular region of the selectable image-filter interface; and
displaying the initial image as filtered based on the selection of the particular region.

14. One or more non-transitory computer readable storage media embodying instructions and coupled to one or more processors that are operable to execute the instructions to:
access an initial image;
apply each image filter from a set of one or more N image filters to the initial image to create N filtered images;
generate a similarity metric for each pair of images in a set of images comprising the initial image and the N filtered images;
determine, based on the similarity metrics, a placement of each image in the set of images within an image-filter space;
generate, based on the image-filter space, a selectable image-filter interface; and
provide the selectable image-filter interface for display, wherein each selectable region of the selectable image-filter interface is associated with a particular filtering of the initial image.

15. The media of claim 14, wherein the N image filters from the set of one or more image filters are predetermined based on a category associated with the initial image.

16. The media of claim 14, wherein the similarity metric comprises a scalar distance metric based on a difference between image-channel histogram values of a pair of images.

17. The media of claim 14, wherein each selectable region of the selectable image-filter interface is represented by a particular color that represents a particular filtering associated with that selectable region.

18. A system comprising:
one or more non-transitory computer readable storage media embodying instructions; and
one or more processors coupled to the non-transitory computer readable storage media, the one or more processors being operable to execute the instructions to:
access an initial image;
apply each image filter from a set of one or more N image filters to the initial image to create N filtered images;
generate a similarity metric for each pair of images in a set of images comprising the initial image and the N filtered images;
determine, based on the similarity metrics, a placement of each image in the set of images within an image-filter space;
generate, based on the image-filter space, a selectable image-filter interface; and
provide the selectable image-filter interface for display, wherein each selectable region of the selectable image-filter interface is associated with a particular filtering of the initial image.

19. The system of claim 18, wherein the N image filters from the set of one or more image filters are predetermined based on a category associated with the initial image.

20. The system of claim 18, wherein the similarity metric comprises a scalar distance metric based on a difference between image-channel histogram values of a pair of images.

* * * * *